Figure 1:
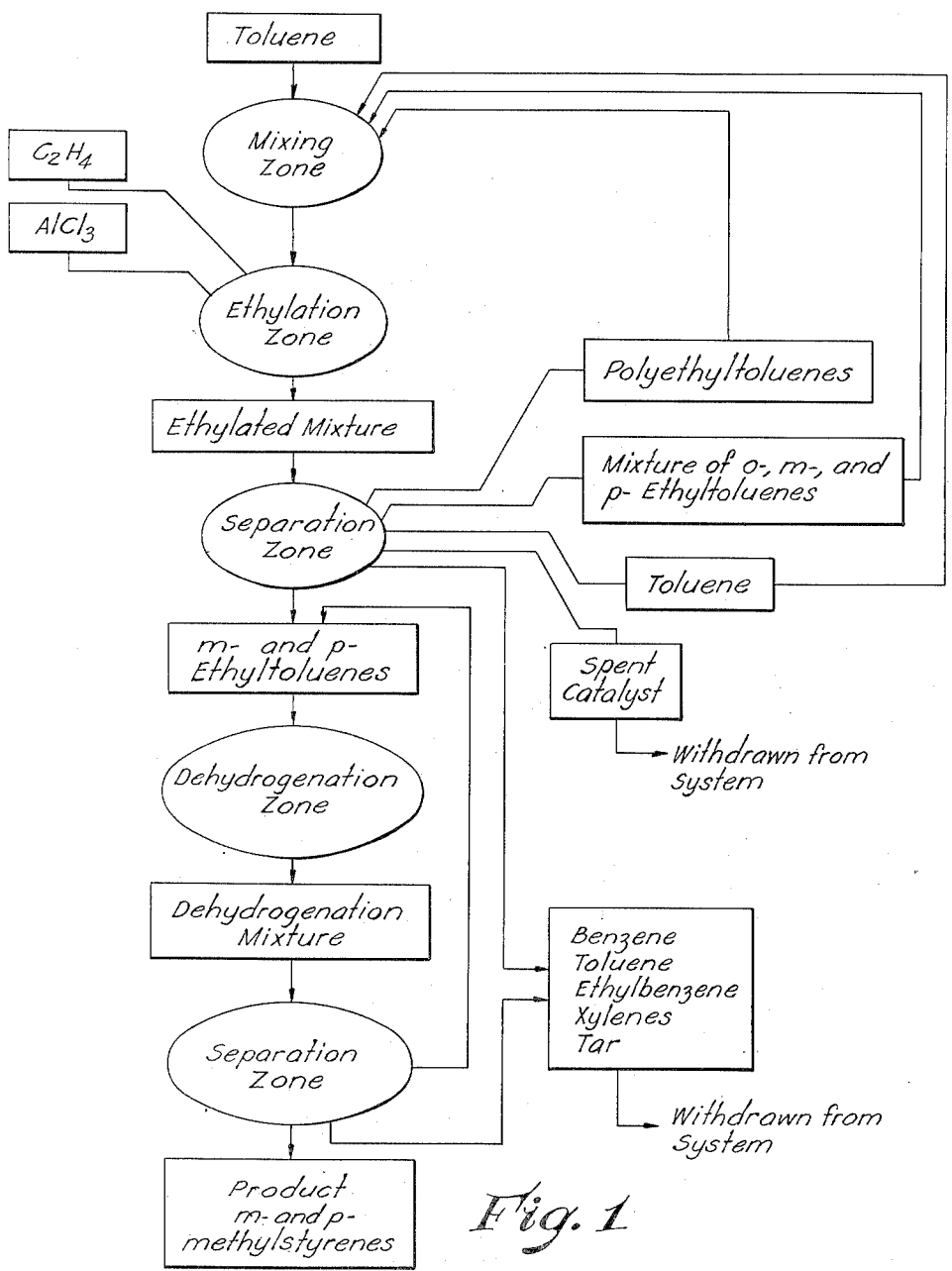

Sept. 18, 1956  J. L. AMOS ET AL  2,763,702
MANUFACTURE OF METHYLSTYRENE
Filed Feb. 28, 1952  3 Sheets—Sheet 3

INVENTORS
James L. Amos
Kenneth E. Coulter
BY
Griswold & Burdick
ATTORNEYS

United States Patent Office 2,763,702
Patented Sept. 18, 1956

2,763,702

MANUFACTURE OF METHYLSTYRENE

James L. Amos, Midland, and Kenneth E. Coulter, Bay County, Mich., assignors to The Dow Chemical Company, Midland, Mich., a corporation of Delaware Application February 28, 1952, Serial No. 273,912

5 Claims. (Cl. 260—669)

This invention concerns an improved method for the manufacture of ar-methylstyrenes from toluene as a starting material. It pertains especially to an integrated process which permits production of a mixture of meta- and paramethylstyrenes in good yield and in a form of high purity.

Styrene is manufactured by reacting ethylene, or other ethylating agents, with benzene to form monoethylbenzene, thermally dehydrogenating the latter to form styrene and separating the styrene by fractional distillation. Ar-methylstyrene has similarly been formed by ethylating toluene, dehydrogenating the resultant mono-(ar-ethyl)-toluenes, and fractionally distilling the mixture to obtain a fraction rich in the isomeric ar-methylstyrenes. As pointed out on page 3949 of Chem. and Eng. News of November 13, 1950, the known method just described produces the mixture of isomeric ar-methylstyrenes in a yield lower than that of styrene similarly prepared, and the ar-methylstyrene product comprises the ortho-isomer which is slow in polymerizing and should be removed. It is also known that the mixture of isomeric ar-methylstyrenes, thus prepared, comprises indane and indene, which are formed from ortho-ethyltoluene during the dehydrogenation and cannot readily or satisfactorily be separated by distillation from the product, and that the indene, in particular causes discoloration and lowers the heat distortion temperature of polymers prepared from the product.

In U. S. Patent No. 2,531,327, it is taught that when a mixture of isomers of ar-ethyltoluene is dehydrogenated, there is obtained a mixture of the unreacted isomeric ar-ethyltoluenes and the corresponding isomeric ar-methylstyrenes, from which the ar-methylstyrenes cannot be separated by distillation. The patent teaches that the foregoing difficulties may be avoided by employing, as the material to be dehydrogenated, a single isomer, other than the orthoisomer, of ar-ethyltoluene. The patent indicates that the presence of minor amounts, i. e. less than 20 per cent by weight, of the ortho-isomer can sometimes be tolerated, but teaches that the remainder of its starting material consists of a single isomer of ar-ethyltoluene other than the orthoisomer.

The method of the above-mentioned patent is theoretically sound, but is not feasible when employing toluene for preparation of the ar-ethyltoluene which is to be dehydrogenated. The ethylation of toluene usually results in a mixture of ortho-, meta-, and para-ethyltoluenes in proportions other than those required by the patent, e. g. in proportions ranging from about 40 to about 70 per cent meta-isomer, 20 to 35 per cent para-isomer and 10 to 25 per cent ortho-isomer, depending on the conditions under which the ethylation is carried out. The boiling points of the individual ar-ethyltoluenes at 760 mm. absolute pressure are 165.1° C. for the ortho-isomer, 162° C. for the para-isomer, and 161.3° C. for the meta-isomer. Because of the narrow temperature range within which all of the isomeric ar-ethyltoluenes boil, it is extremely difficult, or impossible, to separate the individual isomers, particularly the meta- and para-isomers, from one another by distillation. Accordingly, the method of the patent is not suitable for the production of ar-methylstyrene from toluene as a starting material.

We have found that although it is not possible to separate, by fractional distillation, either meta-ethyltoluene or para-ethyltoluene from the mixture of isomeric ar-ethyltoluenes which is obained by the ethylation of toluene, it is both possible and practical to fractionally distill, from the isomeric mixture, from 50 to 90 per cent or more of the meta- and para-ethyltoluenes in admixture with one another and in a form containing not more than 0.5 per cent, usually less than 0.2 per cent, of the ortho-isomer. The residue from the distillation contains nearly all of the ortho-ethyltoluene, usually in admixture with minor amounts of the meta- and para-isomers.

We have further found that the teaching in the above-mentioned U. S. Patent No. 2,531,327, that the ar-methylstyrenes obtained by dehydrogenation of a mixture of isomeric ar-ethyltoluenes cannot be separated from the unreacted ar-ethyltoluenes by distillation, is correct only when the mixture of isomeric ar-ethyltoluenes which is subjected to dehydrogenation includes the ortho-isomer, and that the ar-methylstyrenes which are formed by dehydrogenating a mixture of meta- and para-ethyltoluenes that is substantially free of the ortho-isomer may readily be separated from the reacted mixture by distillation.

We have further found that the residue, of ortho-ethyltoluene together with minor amounts of its meta- and para-isomers and polyethylated toluenes, which remains after distilling the mixture of meta- and para-ethyltoluenes from the ethylated toluene mixture may be returned to the ethylation reaction where it serves to suppress further formation of said compounds and enhances formation of the desired meta- and para-ethyltoluenes.

On a basis of these and other discoveries hereinafter brought out, we have devised the following improved method for the production, from toluene, of a mixture of meta- and para-methylstyrenes in good yield and in a form of high purity.

Figure 2:
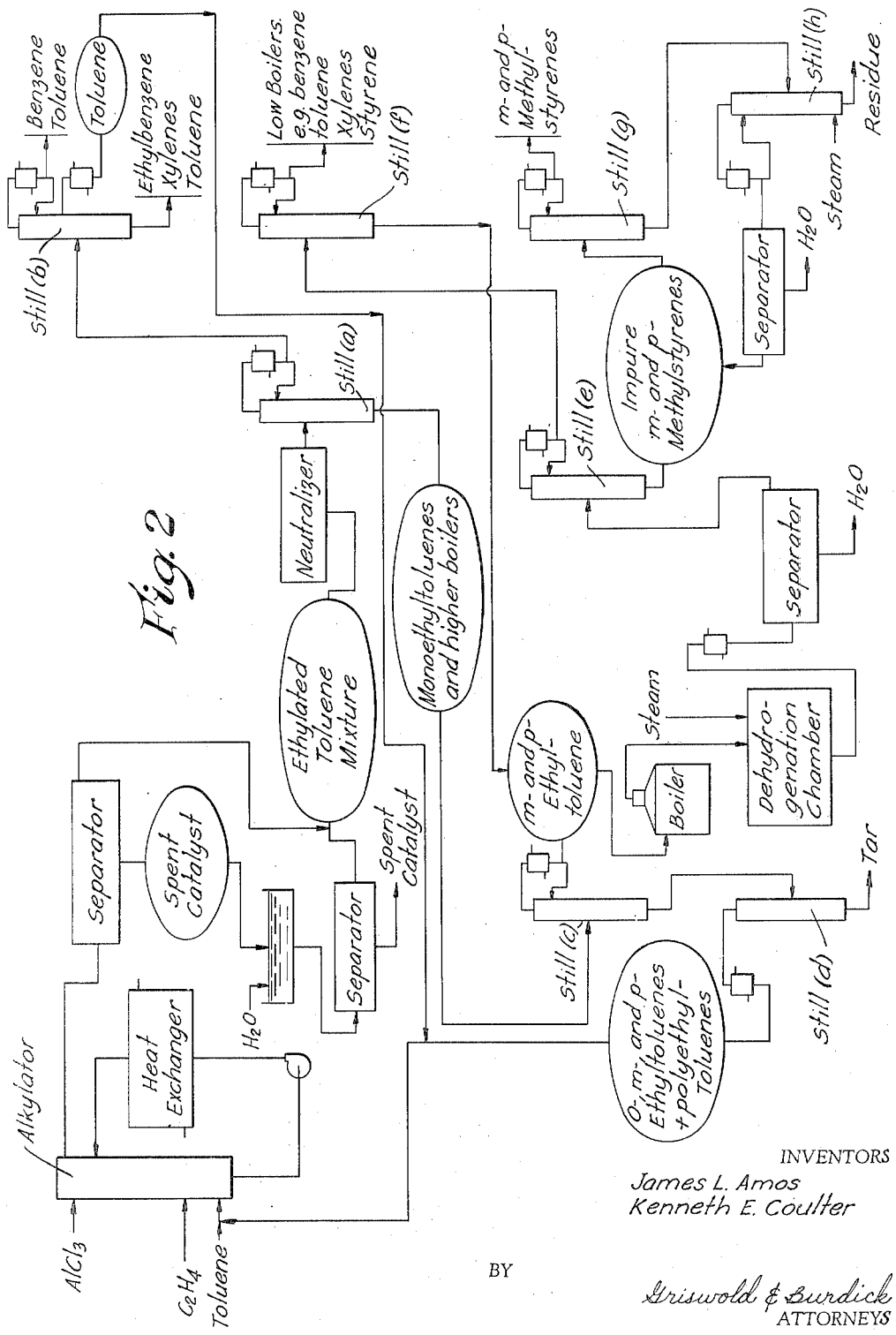
Figure 3:
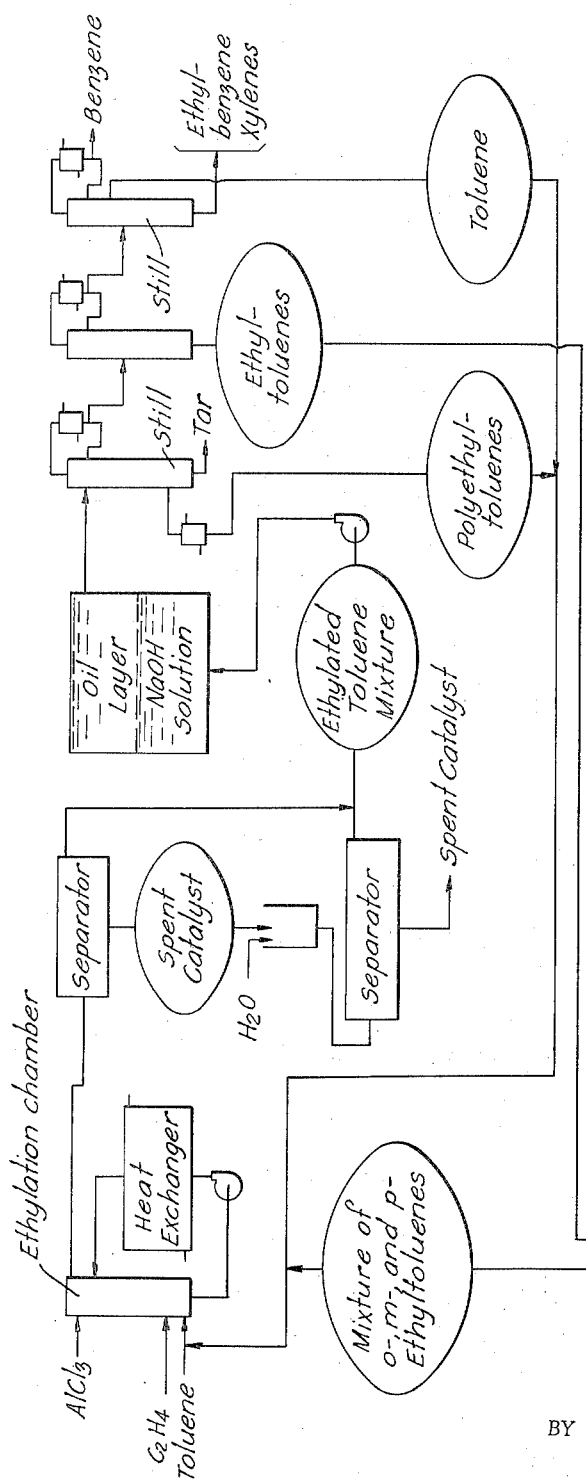
Figure 3:
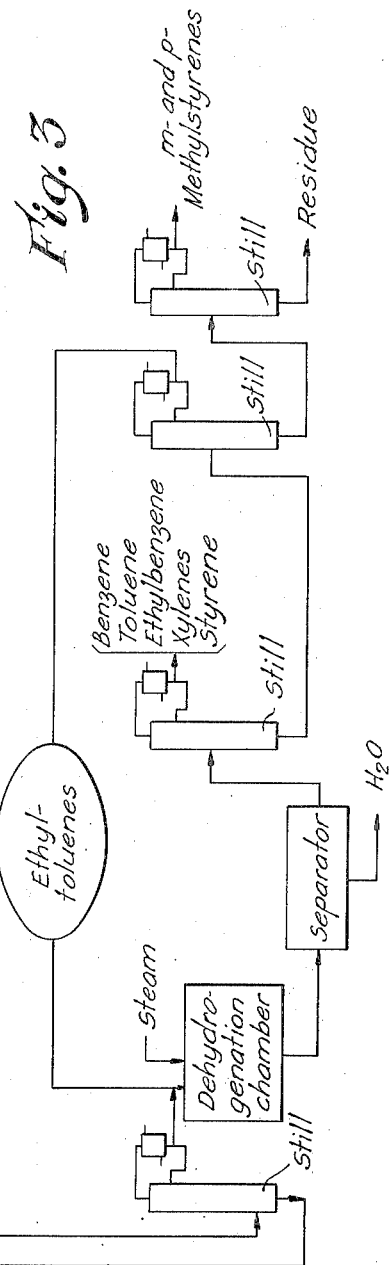

Fig. 1 of the accompanying drawing is a flow sheet showing a general sequence of steps for practice of the invention. Fig. 2 is a schematic sketch showing an arrangement of apparatus suitable for use in practice of the invention and indicating the flow of materials through the apparatus. The apparatus arrangement shown in Fig. 2 corresponds to that which was employed in the experiment described in the example hereinafter presented. Fig. 3 shows in schematic manner, another arrangement of apparatus which may be employed in practice of the invention and indicates the flow of materials therethrough. Other arrangements of apparatus that can be used will be evident. All of the figures of the drawing amount, in effect, to being flow sheets, and are self-explanatory.

According to the invention: (1) toluene is ethylated by reaction with ethylene in the presence of an activated Friedel-Crafts catalyst, such as aluminum chloride, and in the presence of added ethylated toluenes rich in ortho-ethyltoluene; (2) the ethylation product is separated by fractional distillation to obtain, inter alia, a fraction consisting predominately of unreacted toluene, a fraction rich in ortho-ethyltoluene, a fraction consisting predominately of meta-ethyltoluene and para-ethyltoluene and containing not more than 0.5 per cent and usually less than 0.2 per cent by weight of ortho-ethyltoluene, and a fraction comprising polyethyltoluenes; (3) the toluene fraction, the ortho-ethyltoluene fraction and the polyethyltoluene fraction are recycled to the ethylation reaction; (4) the fraction which consists predominately of the meta- and para-isomers of ethyltoluene and contains less than 0.5 per cent by weight of the ortho-isomer is dehydrogenated by passing it together with steam through a dehydrogenation zone at a reaction temperature; and (5) the dehydrogenation product is separated by fractional distillation to obtain, inter alia, a fraction consisting predominately of unreacted ethyltoluene, which fraction is returned to the dehydrogenation zone, and another fraction consisting predominately of a mixture of meta-methylstyrene and para-methylstyrene. The last mentioned fraction, which is the product, contains a total of less than 0.5 per cent, usually less than 0.2 per cent, of ortho-methylstyrene, indane and indene. It is colorless and can be polymerized to obtain substantially colorless, transparent, thermoplastic resins which may be molded into desired articles.

The ethylation of toluene is effected in the presence of a Friedel-Crafts catalyst, preferably aluminum chloride which is activated in known manner with hydrogen chloride or ethyl chloride. The ethylation is conducted to about 40 per cent conversion of the toluene to ethyltoluenes. This usually results in a yield of mono-ethyltoluenes, based on the toluene consumed, of about 95 per cent. The ethylation mixture contains the isomeric mono-ethyltoluenes in relative proportions of from 8 to 30 per cent of the ortho-isomer, 40 to 65 per cent of the meta-isomer, and from 20 to 40 per cent of the para-isomer. Small amounts of benzene, ethylbenzene, zylenes, diethyltoluenes and higher polyethyltoluenes are present as by-products. Since the complex reactions of alkylbenzenes in presence of Friedel-Crafts catalysts include such reactions as dealkylation and isomerization, it has been found possible to utilize certain of the undesired products, e. g. ortho-ethyltoluene and polyethyltoluenes, which are recovered in later stages of the process, as starting materials in the ethylation reaction for formation of meta- and para-ethyltoluenes. For instance, the ortho-ethyltoluene fraction and the poly-ethyltoluene fractions which are separated from the ethylated product by distillation are returned to the ethylation zone. In the presence of the active Friedel-Crafts catalyst, the ortho-isomer appears to be isomerized to a mixture containing its meta- and para-isomers, and the diethyl and polyethyltoluenes appear to be de-ethylated to simpler molecules, including meta- and para-ethylytoluenes. Thereby, the values contained in the ortho-ethyltoluene and higher ethylated toluene fractions, which would otherwise be lost, are salvaged and used to make a further amount of the desired meta- and para-ethyltoluenes.

The ethylated toluene mixture obtained from the ethylation reaction is complex and difficult to separate into each of its many components, but it can be separated into usable fractions. The separation is accomplished by subjecting the ethylation mixture to a series of interrelated fractional distillations. For example, a "light fraction" comprising benzene is separated and withdrawn from the process. A "toluene" fraction is separated and returned to the ethylation zone. A small amount of an ethylbenzene and xylene mixture is separated and discharged from the process. A fraction comprising the ortho-, meta-, and para-isomers of ethyltoluene is preferably separated and refractionated as described below. The diethyltoluene and distillable polyethyltoluenes are separated from a tarry residue and are returned to the ethylation zone.

The above-mentioned fraction of ortho-, meta- and para-ethyltoluenes mixture is again fractionally distilled to obtain a distillate fraction consisting essentially of a mixture of meta- and para-ethyltoluenes, which fraction contains not more than 0.5 per cent, and usually less than 0.2 per cent, by weight of ortho-ethyltoluene.

This mixture of meta- and para-ethyltoluenes may be thermally dehydrogenated in the presence or absence of gaseous diluents, such as nitrogen, carbon dioxide, or steam, and with or without the aid of usual dehydrogenation catalysts. The dehydrogenation is preferably accomplished by vaporizing the hydrocarbons, passing a stream of the vapors into admixture with steam to form a vapor mixture comprising from 1 to 10, advantageously from 2 to 3, parts by weight of steam per part of the hydrocarbons, and passing the vapor mixture through a bed of a solid, granular, dehydrogenation catalyst, or into contact with a fluidized finely divided catalyst, at reaction temperatures between 550° and 700° C., preferably between 560° and 650° C. Any of the catalysts which are suitable for use in dehydrogenating ethylbenzene to form styrene may be used in the process. A considerable number and variety of such catalysts are known. Catalysts of the self-regenerative type, i. e. catalysts which remain substantialyy free of carbonaceous deposits when employed in contact with steam, are preferably used. Under the preferred conditions just described, the dehydrogenation may be carried out to form a mixture of meta- and para-methylstyrenes in a yield of from 38 to 40 per cent of theoretical, based on the amount of ar-ethyltoluenes fed to the reaction, or in a yield of from 75 to 85 per cent, based on the amount of ar-ethyltoluenes consumed in the dehydrogenation reaction.

The vapor mixture flowing from the reaction zone is cooled to condense the organic products and the aqueous and organic layers of the condensate are separated. The organic layer consists for the most part of unreacted meta- and para-ethyltoluenes and of the meta-, and para-methylstyrene products. However, it contains minor amounts of by-products such as benzene, ethylbenzene, toluene, and xylene, etc. The meta- and para-methylstyrenes may readily be separated from this mixture by fractional distillation.

The dehydrogenation mixture is fractionally distilled, preferably in a series of continuously operating rectifying columns. The distillation is preferably conducted under reduced pressure in order to reduce the tendency of the ar-methylstyrenes to polymerize, and there is also preferably added a polymerization inhibitor. The unconverted ethyltoluenes are separated as a lower boiling fraction from the ar-methylstyrenes, and the ethyltoluene fraction is returned to the dehydrogenation zone. Small amounts of low-boiling and high-boiling materials are disposed of, e. g. by being recycled, or withdrawn from the system, as hereinbefore described. The principal product is a mixture of ar-methylstyrenes of from 99 to 99.9 percent purity or higher. It comprises from about 53 to about 78 per cent by weight of meta-methylstyrene, and from about 47 per cent to about 22 per cent of para-methylstyrene. It contains less than 0.5 per cent, and usually less than 0.2 per cent, ortho-methylstyrene. Indane and indene, if present, are usually in amount less than can be detected by present methods of analysis.

The following example describes a way in which the invention has been practiced, but is not limiting as to its scope.

*Example*

A mixture of meta- and para-methylstyrenes was produced from toluene, as a starting material, using an arrangement of apparatus similar to that illustrated in Fig. 2 of the drawing. An ethylated toluene mixture was produced by simultaneously feeding, to a reaction vessel, fresh toluene at a rate of from 60 to 65 pounds per hour; recycled toluene at a rate of from 75 to 80 pounds per hour; a fraction comprising ortho-ethyltoluene and poly-ethyltoluenes, recovered from other stages of the process, at a rate of from 55 to 60 pounds per hour, gaseous ethylene at a rate of 15 pounds per hour, aluminum chloride at a rate of from 1.5 to 1.7 pounds per hour, and ethyl chloride at a rate of one pound per hour. The reaction mixture was maintained at temperatures of from 90° to 101° C., the average temperature being about 98° C., by circulating a portion of the reaction mixture through a temperature-control unit, i. e. a heat-exchanger. The reactor was of a size such that the inventory time for passage of an infinitesmal amount of the reaction mixture through the same was between 54 and 60 minutes. Approximately half of the volume of the reactor was occupied by the catalyst complex which was formed. A portion of the catalyst complex flowed from the reactor together with the effluent reaction mixture and was removed from the latter by separating a settled layer thereof and washing it with water. The rate of catalyst removal was equivalent to the rate at which fresh catalyst was added to the reaction mixture. The ethylation product flowed from the reactor at a rate of from 200 to 215 pounds per hour. It was washed with an aqueous sodium hydroxide solution to remove any traces of catalysts, or other acidic ingredients, therefrom. Samples of the feed mixture to the ethylation reaction, and also of the effluent reaction mixture, were withdrawn at intervals and analyzed. The average values, expressed as per cent by weight, for the analyses were:

| Ingredients | Percent by Weight in— | |
|---|---|---|
| | Feed Mixture | Effluent Ethylation Mixture |
| Lights, e. g. benzene, etc | 0.21 | 0.23 |
| Toluene | 72.70 | 42.75 |
| Ethylbenzene+xylene | 1.17 | 1.42 |
| p-ethyltoluene | 0.88 | 12.00 |
| m-ethyltoluene | 0.63 | 15.57 |
| o-ethyltoluene | 4.70 | 7.86 |
| Highers, e. g. polyethyltoluene | 19.71 | 19.31 |
| Tar | | 0.86 |

The crude ethylation product was fed to the first of a series of continuously operating stills, hereinafter referred to as stills (a), (b), (c) and (d), respectively. The first still was operated at a head pressure of 225 mm. and produced a distillate comprising benzene, toluene, ethylbenzene and xylenes at a rate of from 70 to 90 pounds per hour. The bottoms product, i. e. residue, from still (a) was produced at a rate of from 125 to 130 pounds per hour. It comprised the isomeric monoethyltoluenes, polethyltoluenes, and tarry material. The distillate from still (a) was fed to still (b) which was operated at approximately atmospheric pressure. From still (b) there were obtained a small overhead fraction consisting of approximately equal weights of benzene and toluene; a side fraction of toluene of greater than 99 per cent purity, which side fraction was produced at a rate of from 70 to 90 pounds per hour; and a small bottoms fraction comprising ethylbenzene, isomeric xylenes, and from 20 to 30 per cent by weight of toluene. The overhead benzene-containing fraction and the bottoms fraction were discharged from the process. The ethyltoluene bottoms product from still (a) contained about 60 per cent by weight of the three isomeric monoethyltoluenes and about 40 per cent of polyethyltoluenes. The bottoms product from still (a) was fed at a rate of from 125 to 130 pounds per hour to a still (c) which was operated at a still-head pressure of 350 mm. absolute. As the overhead product from still (c) there was obtained, at a rate of from 55 to 60 pounds per hour, a mixture of from 53 to 38 per cent by weight meta-ethyltoluene and from 42 to 47 per cent para-ethyltoluene. This overhead product contained less than 0.2 per cent of ortho-ethyltoluene. The bottoms product from still (c) was produced at a rate of from 65 to 70 pounds per hour and comprised about 25 per cent by weight of the isomeric ar-ethyltoluenes (principally the ortho-isomer) and about 75 per cent of polyethyltoluenes and tarry material. This bottoms product from still (c) was fed to a tar still (d) where it was flash distilled at approximately 20 mm. absolute pressure to recover the vaporizable materials from the tarry residue, which was discarded. The distillate comprised isomeric ethyltoluenes (principally the ortho-isomer) and polyethyltoluenes. It was returned to the ethylation reaction. The overhead product from still (c), which consisted essentially of a mixture of meta- and para-ethyltoluenes, was vaporized. The vapors were preheated to about 500° C. and passed at a rate of about 42 pounds per hour into admixture with a current of steam preheated to temperatures between 675° and 725° C. and flowing at a rate of 125 pounds per hour. The resultant vapor mixture was passed through a bed of a granular dehydrogenation catalyst at temperatures of from 595° to 620° C. The catalyst was of the promoted iron oxide-potassium oxide type and was self-regenerative in the presence of steam. The rate of flow through the catalyst bed corresponded to 21 pounds of the ar-ethyltoluenes in the feed mixture per cubic foot of the bed per hour. The vapor mixture flowing from the catalyst chamber was cooled to condense the organic products and steam and the organic layer of the condensate was separated. Samples of the organic layer being collected were analyzed from time to time. The samples were found to vary in composition within the limits expressed below, the average composition for all of the samples being as indicated.

| | Range, percent by wt. | Average, percent by wt. |
|---|---|---|
| Low boilers | 7–10 | 8.8 |
| Monoethyltoluene | 51–62 | 55.4 |
| Ar-methylstyrene | 31–39 | 35.5 |
| High boilers | 0.2–0.5 | 0.3 |

The crude dehydrogenation product was treated with 500 parts per million of dinitro-orthocresol as a polymerization inhibitor. It was fed, at a rate of from 75 to 100 pounds per hour, to a continuously operating still (e) where it was fractionally distilled at from 30 to 40 mm. absolute pressure. From 58 to 72 per cent of the feed was taken off as overhead product, the remainder being withdrawn as a bottoms product. The overhead product from still (e) was a mixture of monoethyltoluenes and lower boiling ingredients. It contained less than 1 per cent by weight of ar-methylstyrene. It was fed, at a rate of 60 pounds per hour, to a still (f) where it was redistilled to remove from 5 to 10 per cent by weight of the feed material as distillate and obtain from 95 to 90 per cent of the feed as a bottoms product. The distillate and bottoms product from the still (f) had the following composition, expressed as per cent by weight.

| | Distillate, percent | Bottoms, percent |
|---|---|---|
| Benzene | 2.2 | |
| Toluene | 28.1 | 0.072 |
| Ethylbenzene | 2.8 | |
| Xylene | 52.7 | 0.036 |
| Styrene | 14.2 | 0.125 |
| Ar-Methylstyrenes | | 0.5 to 1.1 |
| O-Ethyltoluene | | 0.2 |
| m- and p-ethyltoluenes | | 98.4 to 99 |

The distillate from still (f) was discharged from the process and the bottoms product was returned to the dehydrogenation reaction. The bottoms product from still (e) comprised a mixture of meta- and para-methylstyrenes which contained less than 1 per cent by weight of ar-ethyltoluenes. It was fed at a rate of 40 pounds per hour to a still (g) where it was redistilled at a pressure of 15 mm. absolute. The distillate was obtained at a rate of 35 pounds per hour and consisted of a mixture of meta- and para-methylstyrenes of greater than 99% purity. The residue from still (g) comprised ar-methylstyrenes, diethylbenzene, ethylstyrene, inhibitor and tarry ingredients. It was fed to a still (h) where the ar-methylstyrenes were steam distilled therefrom and returned to the still (g). The remaining material was discharged from the process.

The procedure described in the above example and illustrated in Fig. 2 of the drawing may be modified by changing the order in which the ingredients of the ethylated toluene mixture are separated. Such a modified procedure is illustrated schematically by Fig. 3 of the drawing, which in effect is a flow sheet. In Fig. 3, the steps for ethylating toluene in continuous manner and removing catalyst from the crude ethylated toluene are similar to those indicated in Fig. 2 and described in the above example. However, in the procedure indicated by Fig. 3, the crude ethylated toluene is fed to a still from which tar is removed as a residue and polyethyltoluenes are obtained as a side stream from a lower section of the distillation column. The mixture of isomeric mono-ethyltoluenes and lower boiling ingredients passes overhead to other stills for further refinement and for separation of a mixture of meta- and para-ethyltoluenes from the mixture of the three isomeric mono-ethyltoluenes. The fact that the polyethyltoluene and higher boiling ingredients are first removed from the crude mono-ethyltoluene product facilitates purification of the latter and separation of the desired isomers thereof. Also, in Fig. 3 the mixture of meta- and para-ethyltoluenes is dehydrogenated, after which the resulting mixture of meta- and para-methylstyrenes is separated and purified by a combination of distillation operations different from that indicated in Fig. 2 of the drawing. Since Fig. 3 is, in effect, a flow sheet, its sequence of distillation operations for separating the mixture of meta- and para-methylstyrenes from the crude dehydrogenation mixture is as shown. In brief, Figs. 2 and 3 of the drawing show, in schematic manner, alternative combinations of steps and apparatus for practice of the invention.

We claim:

1. A method of producing a mixture of meta- and para-methylstyrenes from toluene as a starting material, which method comprises ethylating toluene in the presence of a Friedel-Crafts catalyst to form a mixture comprising unreacted toluene and the three isomeric mono-ethyltoluenes together with polyethyltoluenes, separating the ethylation mixture by fractional distillation to obtain a fraction rich in toluene, a fraction rich in ortho-ethyltoluene, a fraction which is rich in a mixture of meta-ethyltoluene and para-ethyltoluene and which contains not more than 0.5 per cent by weight of ortho-ethyltoluene, and a fraction which is rich in polyethyltoluenes recycling to the ethylation reaction the fraction rich in toluene, the fraction rich in ortho-ethyltoluene and the fraction rich in polyethyltoluenes, vaporizing the fraction rich in meta- and para-ethyltoluenes and passing the vapors through a dehydrogenation zone at a reaction temperature to form a mixture comprising unreacted meta- and para-ethyltoluenes and meta- and para-methylstyrenes, cooling the effluent vapors to condense the aromatic products, and separating the condensed products by fractional distillation to obtain a fraction rich in the unreacted meta- and para-ethyltoluenes and another fraction which is rich in meta- and para-methylstyrenes and contains not more than 0.5 per cent by weight of ortho-methylstyrene.

2. In a method for making a mixture of meta- and para-methylstyrenes from toluene as a starting material, the steps of feeding ethylene and toluene to a mixture comprising ortho-ethyltoluene, polyethyltoluenes and a Friedel-Crafts catalyst while maintaining the resultant mixture at a reaction temperature, fractionally distilling the products of the ethylation reaction to separate a fraction rich in toluene, a fraction rich in ortho-ethyltoluene, a fraction rich in meta- and para-ethyltoluenes and containing not more than 0.2 per cent by weight of ortho-ethyltoluene, and a fraction rich in poly-ethyltoluenes, vaporizing the fraction rich in meta- and para-ethyltoluene and passing a vapor mixture of the same and steam at a reaction temperature into contact with a dehydrogenation catalyst to form a mixture comprising meta- and para-methylstyrenes and unreacted meta- and para-ethyltoluenes, cooling the effluent vapors to condense the aromatic products, fractionally distilling the condensate to separate therefrom a fraction rich in the unreacted meta- and para-ethyltoluenes and another fraction rich in meta- and para-methylstyrenes and containing not more than 0.2 per cent by weight of ortho-methylstyrenes, and, while continuing the above-stated operations, recycling the distillate fraction rich in toluene, the fraction rich in ortho-ethyltoluene, and the fraction rich in polyethyltoluenes to the ethylation reaction and recycling the fraction of unreacted meta- and para-ethyltoluenes which is separated by distillation from the meta- and para-methylstyrenes to the dehydrogenation reaction.

3. A method which comprises thermally dehydrogenating a vaporized mixture of meta- and para-ethyltoluenes to form a mixture of meta- and para-methylstyrenes together with unreacted meta- and para-ethyltoluenes, cooling the reacted vapor mixture to condense the aromatic products, fractionally distilling the condensed organic mixture to separate therefrom a fraction of unreacted meta- and para-ethyltoluenes and another fraction of meta- and para-methylstyrenes, and recycling the fraction of unreacted meta- and para-ethyltoluenes to the dehydrogenation reaction.

4. A method which comprises thermally dehydrogenating a vaporized mixture of meta- and para-ethyltoluenes to form a mixture of meta- and para-methylstyrenes together with unreacted meta- and para-ethyltoluenes, cooling the reacted vapor mixture to condense the aromatic products, and fractionally distilling the condensed organic mixture to separate therefrom a fraction of unreacted meta- and para-ethyltoluenes and another fraction of meta- and para-methylstyrenes.

5. A process which comprises thermally dehydrogenating a vaporized mixture of meta- and para-ethyltoluenes to form a mixture of meta- and para-methylstyrenes together with unreacted meta- and para-ethyltoluenes, cooling the reacted vapor mixture to condense the aromatic products, fractionally distilling the condensed organic mixture to separate therefrom a fraction of meta- and para-ethyltoluenes and a fraction of meta- and para-methylstyrenes, and recycling the fraction of unreacted meta- and para-ethyltoluenes in the process.

References Cited in the file of this patent

UNITED STATES PATENTS

| | | |
|---|---|---|
| 2,338,711 | d'Ouville et al. | Jan. 11, 1944 |
| 2,376,532 | Egloff | May 22, 1945 |
| 2,389,444 | Mattox | Nov. 20, 1945 |
| 2,401,846 | Sumerford | June 11, 1946 |
| 2,402,740 | Doumani et al. | June 25, 1946 |
| 2,410,111 | Thomas et al. | Oct. 29, 1946 |
| 2,410,151 | Danforth | Oct. 29, 1946 |
| 2,416,990 | Gorin et al. | Mar. 4, 1947 |
| 2,506,289 | Beach et al. | May 2, 1950 |
| 2,518,236 | Hirschler | Aug. 8, 1950 |
| 2,531,327 | Elwell | Nov. 21, 1950 |